US012785066B2

(12) United States Patent
Tang et al.

(10) Patent No.: US 12,785,066 B2
(45) Date of Patent: Nov. 3, 2026

(54) NEGATIVE ELECTRODE SHEET AND LITHIUM-ION BATTERY INCLUDING SAME

(71) Applicant: Zhuhai CosMX Battery Co., Ltd., Guangdong (CN)

(72) Inventors: Weichao Tang, Guangdong (CN); Suli Li, Guangdong (CN); Wei Zhao, Guangdong (CN); Chunyang Liu, Guangdong (CN); Zhaohua Mo, Guangdong (CN); Zhaoshuai Zhang, Guangdong (CN); Derui Dong, Guangdong (CN)

(73) Assignee: ZHUHAI COSMX BATTERY CO., LTD., Guangdong (CN)

( * ) Notice: Subject to any disclaimer, the term of this patent is extended or adjusted under 35 U.S.C. 154(b) by 650 days.

(21) Appl. No.: 18/227,252

(22) Filed: Jul. 27, 2023

(65) Prior Publication Data

US 2023/0369563 A1 Nov. 16, 2023

Related U.S. Application Data

(63) Continuation of application No. PCT/CN2022/081032, filed on Mar. 15, 2022.

(30) Foreign Application Priority Data

Mar. 15, 2021 (CN) ......................... 202110276573.7

(51) Int. Cl.

| | |
|---|---|
| ***H01M 4/134*** | (2010.01) |
| ***H01M 4/02*** | (2006.01) |
| ***H01M 4/36*** | (2006.01) |
| ***H01M 4/38*** | (2006.01) |
| ***H01M 4/583*** | (2010.01) |
| ***H01M 10/0525*** | (2010.01) |

(52) U.S. Cl.

CPC ........... *H01M 4/134* (2013.01); *H01M 4/364* (2013.01); *H01M 4/386* (2013.01); *H01M 4/583* (2013.01); *H01M 10/0525* (2013.01); *H01M 2004/027* (2013.01)

(58) Field of Classification Search

CPC ........ H01M 4/134; H01M 4/02; H01M 4/583; H01M 4/1395; H01M 4/364; H01M 4/38; H01M 4/386; H01M 4/62; H01M 4/622; H01M 4/628; H01M 4/625; H01M 10/0525; H01M 10/0565; H01M 10/42

See application file for complete search history.

(56) References Cited

U.S. PATENT DOCUMENTS

2012/0153219 A1 6/2012 Zhang et al.

FOREIGN PATENT DOCUMENTS

| | | | | | |
|---|---|---|---|---|---|
| CN | 1658411 | A | | 8/2005 | |
| CN | 111725509 | A | | 9/2020 | |
| CN | 111732916 | A | | 10/2020 | |
| JP | 2003268053 | A | | 9/2003 | |
| JP | 2015159069 | A | * | 9/2015 | ............. H01G 11/38 |

OTHER PUBLICATIONS

International Search Report issued in related International Application No. PCT/CN2022/081032, mailed on Jun. 8, 2022, in 11 pages.

First Office Action issued in related Chinese Application No. 2021102765737, in 9 pages.

State Intellectual Property Office of China, "Reject Decision" in Application No. 202110276573.7. Apr. 27, 2024, 23 pages.

Qingyuan, Wang et al., "User Manual of Unknown Title", 19 pages.

* cited by examiner

*Primary Examiner* — Karie O'Neill Apicella

(74) *Attorney, Agent, or Firm* — Davis Wright Tremaine LLP

(57) ABSTRACT

The present disclosure provides a negative electrode sheet and a lithium-ion battery including same. A negative electrode active material, a conductive agent, a binder, and an auxiliary agent (a compound represented by Formula 1) are used in the negative electrode sheet of the present disclosure, the above substances are dissolved in a solvent, uniformly mixed, and coated on a surface of a negative electrode current collector, after drying, the negative electrode sheet of the present disclosure can be obtained. The auxiliary agent (the compound represented by Formula 1), due to its small molecular weight and short polymer chain segment, can be fully mixed with the negative electrode active material, conductive agent, and binder.

16 Claims, No Drawings

NEGATIVE ELECTRODE SHEET AND LITHIUM-ION BATTERY INCLUDING SAME

CROSS-REFERENCE TO RELATED APPLICATIONS

This application is a continuation of International Application No. PCT/CN2022/081032, filed on Mar. 15, 2022, which claims priority to Chinese Patent Application No. 202110276573.7, filed on Mar. 15, 2021, both of which are hereby incorporated by reference in their entireties.

TECHNICAL FIELD

The present disclosure relates to the technical field of lithium-ion batteries, and in particular, to a negative electrode sheet including a silicon-based material and optionally a carbon-based material, and a lithium-ion battery including the negative electrode sheet.

BACKGROUND

Lithium-ion batteries have the advantages of long cycle life, low self-discharge rate and being environmentally friendly, and have been widely used in notebook computers, mobile phones, cameras, and other consumer electronics. A lithium-ion battery is mainly composed of a positive electrode, a negative electrode, a separating membrane, and an electrolyzing solution, the negative electrode material of the lithium-ion battery, as an important component thereof, is vital for the lithium-ion battery.

The negative electrode material of the lithium-ion battery is mainly composed of graphite, hard carbon, silicon, silicon oxide, tin, etc. Silicon-based negative electrode has high gram capacity and rich content, and is an important material for high energy density batteries. However, a solid electrolyte interphase film on a surface of the silicon-based negative electrode is continuously consumed, the cycle life of the battery is thus affected, resulting in a main bottleneck that limits the application of the silicon-based negative electrode, especially, the continuous consumption of the solid electrolyte interphase film on the surface of the silicon-based negative electrode results in the deterioration of battery performance. Thus, how to improve the cycle performance of the silicon-based negative electrode is particularly important.

SUMMARY

In order to improve the shortcomings that a silicon-based negative electrode material has a continuous consumption of a solid electrolyte interphase film and has side reactions that directly affect the effective transmission of lithium-ions and electrons inside an electrode sheet during charging and discharging processes in the prior art, the present disclosure provides a negative electrode sheet and a lithium-ion battery including same. The negative electrode sheet can effectively improve the transmission of lithium-ions and electrons, form a solid electrolyte interphase film having a stable structure, inhibit volume change of the negative electrode sheet, and improve the cycling performance of the silicon-based negative electrode, especially the cycling performance of the silicon-based negative electrode at room temperature.

The purpose of the present disclosure is achieved through the following technical solution:

a negative electrode sheet including a negative electrode current collector, and a negative electrode active material layer coated on one or both surfaces of the negative electrode current collector. The negative electrode active material layer includes a negative electrode active material, a conductive agent, a binder, and an auxiliary agent, where the negative electrode active material includes a silicon-based material; the auxiliary agent is selected from at least one of a compound represented by Formula 1:

Formula 1

$$R_1—R—M—R'—R'_1,$$

in Formula 1, M is selected from a polyphenylene ether chain segment, a polyethylene glycol chain segment, a polyethanedithiol chain segment, a polycarbonate chain segment, a polypropylene glycol chain segment, or a polysiloxane chain segment; each of $R_1$ and $R'_1$ is a terminal group, and at least one of $R_1$ and $R'_1$ includes a carbon-carbon double bond or a carbon-carbon triple bond as the terminal group; each of R and R' is a linking group.

For a silicon-based material in a negative electrode of a conventional battery system, with the charging and discharging of the battery, there are alloying and dealloying of lithium-ions in the silicon-based negative electrode, resulting in irregular expansion of the volume of the silicon-based material, and thus, more interphases are generated to produce a solid electrolyte interphase film, therefore, a large amount of solvent and auxiliary agent are consumed. An auxiliary agent containing a carbon-carbon double bond or a carbon-carbon triple bond for the negative electrode is used in the present disclosure, and the carbon-carbon double bond or carbon-carbon triple bond undergoes electrochemical polymerization at a low potential, and thus, a stable solid electrolyte interphase film is formed in the silicon-based negative electrode, thereby effectively slowing down the occurrence of side reactions on the interphases of the silicon-based material, reducing the increase of internal resistance during a battery cycling process, and improving battery cycle performance.

According to the present disclosure, each of $R_1$ and $R'_1$ is a terminal group, and at least one of $R_1$ and $R'_1$ includes at least one of the following groups as the terminal group: $—O—(C═O)—C(R_2)═C(R'_2)(R'_2)$, $—N(R_3)—(C═O)—C(R_2)═C(R'_2)(R'_2)$, $—C(R_2)═C(R'_2)(R'_2)$, where $R_2$ is selected from H or an organic functional group (such as $C_{1-12}$ alkyl, $C_{3-20}$ cycloalkyl, 3-20 membered heterocyclic group, $C_{6-18}$ aryl, 5-20 membered heteroaryl, bridged ring group formed by $C_{3-20}$ cycloalkyl and $C_{3-20}$ cycloalkyl, bridged ring group formed by $C_{3-20}$ cycloalkyl and 3-20 membered heterocyclic group, bridged ring group formed by 3-20 membered heterocyclic group and 3-20 membered heterocyclic group); $R'_2$ are the same or different, and independently selected from H or an organic functional group (such as $C_{1-12}$ alkyl, $C_{3-20}$ cycloalkyl, 3-20 membered heterocyclic group, $C_{6-18}$ aryl, 5-20 membered heteroaryl, bridged ring group formed by $C_{3-20}$ cycloalkyl and $C_{3-20}$ cycloalkyl, bridged ring group formed by $C_{3-20}$ cycloalkyl and 3-20 membered heterocyclic group, bridged ring group formed by 3-20 membered heterocyclic group and 3-20 membered heterocyclic group); $R_3$ is selected from H or $C_{1-3}$ alkyl.

According to the present disclosure, one or both of $R_1$ and $R'_1$ include one or two of the following groups as the terminal groups: $—O—(C═O)—C(R_2)═C(R'_2)(R'_2)$, —$N(R_3)$—(C═O)—$C(R_2)$═$C(R'_2)(R'_2)$, —$C(R_2)$═$C(R'_2)(R'_2)$, —C≡C—$R'_2$; where $R_2$ is selected from H or $C_{1-6}$ alkyl (for example, selected from H or $C_{1-3}$ alkyl; for another example, selected from H or methyl); $R'_2$ are the same or different, and independently selected from H or $C_{1-6}$ alkyl (for example, selected from H or $C_{1-3}$ alkyl; for another example, selected from H or methyl); $R_3$ is selected from H or $C_{1-3}$ alkyl.

According to the present disclosure, R and R' are the same or different, and independently selected from absent, alkylene, —$NR_3$—, where $R_3$ is H or $C_{1-3}$ alkyl.

In an implementation, R and R' are the same or different, and independently selected from absent, —$CH_2$—, —$CH_2CH_2$—, —NH—, —$N(CH_3)$—, —$N(CH_2CH_3)$—.

According to the present disclosure, the polyphenylene ether chain segment has a repeating unit represented by Formula 2:

Formula 2

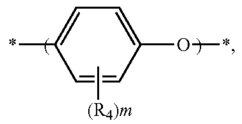

in Formula 2, $R_4$ is selected from H or $C_{1-6}$ alkyl, and m is an integer between 0 and 4. For example, $R_4$ is selected from H or $C_{1-3}$ alkyl, and m is an integer between 0 and 2.

Specifically, the polyphenylene ether chain segment has a repeating unit represented by Formula 2':

Formula 2'

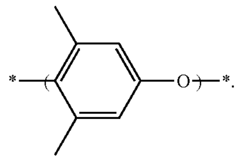

According to the present disclosure, the polyethylene glycol chain segment has a repeating unit represented by Formula 3:

Formula 3

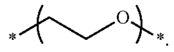

According to the present disclosure, the polypropylene glycol chain segment has a repeating unit represented by Formula 4:

Formula 4

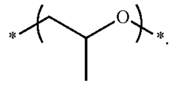

According to the present disclosure, the polyethanedithiol chain segment has a repeating unit represented by Formula 5:

Formula 5

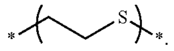

According to the present disclosure, the polycarbonate chain segment has a repeating unit represented by Formula 6:

Formula 6

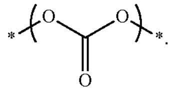

According to the present disclosure, the polysiloxane chain segment has a repeating unit represented by Formula 7:

Formula 7

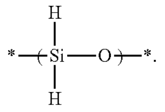

According to the present disclosure, the compound represented by Formula 1 has a number-average molecular weight of 200-3000, in an implementation, the compound represented by Formula 1 has a number-average molecular weight of 300-10000.

According to the present disclosure, the compound represented by Formula 1 is selected from at least one of polyethanedithiol acrylate, polyethanedithiol methacrylate, polyethanedithiol diacrylate, polyethanedithiol dimethyl acrylate, polyethanedithiol phenyl ether acrylate, polyethanedithiol monoallyl ether, polyethylene glycol acrylate, polyethylene glycol methacrylate, polyethylene glycol diacrylate, polyethylene glycol dimethacrylate, polyethylene glycol phenyl ether acrylate, polyethylene glycol monoallyl ether, polycarbonate acrylate, polycarbonate methacrylate, polycarbonate diacrylate, polycarbonate dimethyl acrylate, polycarbonate phenyl ether acrylate, polycarbonate monoallyl ether, polypropylene glycol acrylate, polypropylene glycol methacrylate, polypropylene glycol diacrylate, polypropylene glycol dimethacrylate, polypropylene glycol phenyl ether acrylate, polypropylene glycol monoallyl ether, polysiloxane acrylate, polysiloxane methacrylate, polysiloxane diacrylate, polysiloxane dimethyl acrylate, polysiloxane phenyl ether acrylate, and polysiloxane monoallyl ether.

According to the present disclosure, the negative electrode active material layer includes components with mass percentage contents as following: 75-98 wt % of the negative electrode active material, 1-15 wt % of the conductive agent, 0.999-10 wt % of the binder, and 0.001-2 wt % of the auxiliary agent.

According to the present disclosure, the silicon-based material is selected from at least one of nano silicon, $SiO_x$ ($0<x<2$), aluminum-silicon alloy, magnesium-silicon alloy, boron-silicon alloy, phosphorus-silicon alloy, and lithium-silicon alloy.

According to the present disclosure, the negative electrode active material further includes a carbon-based material, and the carbon-based material is selected from at least one of artificial graphite, natural graphite, hard carbon, soft carbon, mesocarbon microbead, fullerene, and graphene.

In a negative electrode of a conventional battery system, with the charging and discharging of the battery, there are alloying and dealloying of lithium-ions in the negative electrode of the silicon-based material and carbon-based material, resulting in irregular expansion of the volume of the negative electrode sheet, and thus, more interphases are generated to produce a solid electrolyte interphase film, thereof, a large amount of solvent and auxiliary agent are consumed in the electrolyzing solution. An auxiliary agent containing a carbon-carbon double bond or a carbon-carbon triple bond is used in the present disclosure, the carbon-carbon double bond or carbon-carbon triple bond undergoes electrochemical polymerized at a low potential, and thus, a stable solid electrolyte interphase film is formed in the negative electrode of silicon-based material and carbon-based material, thereby effectively slowing down the occurrence of side reactions on the interphases between the silicon-based material and the carbon-based material, reducing the increase of internal resistance during a battery cycling process, and improving battery cycle performance.

According to the present disclosure, the negative electrode active material layer (after rolling) has a thickness of 20 μm-200 μm, in an implementation, the negative electrode active material layer (after rolling) has a thickness of 30 μm-150 μm.

The present disclosure further provides a lithium-ion battery including the above negative electrode sheet.

The beneficial effects of the present disclosure:

the present disclosure provides a negative electrode sheet and a lithium-ion battery including same. A negative electrode active material, a conductive agent, a binder, and an auxiliary agent (a compound represented by Formula 1) are used in the negative electrode sheet of the present disclosure. The negative electrode active material, the conductive agent, the binder, and the auxiliary agent are dissolved in a solvent, uniformly mixed, and coated on a surface of a negative electrode current collector, after drying, the negative electrode sheet of the present disclosure can be obtained. The auxiliary agent (the compound represented by Formula 1), due to its small molecular weight and short polymer chain segment, can be fully mixed with the negative electrode active material, the conductive agent, and the binder. The auxiliary agent (the compound represented by Formula 1) is in a viscous liquid state, semi solid state, or solid state at room temperature, therefore, it can fully contact various components in the negative electrode and immerse in internal pores of the electrode sheet. That is, the auxiliary agent of the present disclosure can form a film on the surface of the negative electrode active material, thereby effectively improving the increase of internal resistance of the silicon-based negative electrode during the cycling process, and increasing cycling life. The auxiliary agent of the present disclosure can also participate in the film-forming reaction of the silicon-based negative electrode to form a solid electrolyte interphase film structure with a certain molecular weight on the surface of the silicon-based negative electrode, thereby improving the composition of the solid electrolyte interphase film on the surface of the silicon-based negative electrode, increasing the content of the polymer component in the solid electrolyte interphase film, improving the conduction of electrons and lithium-ions in the negative electrode sheet of the battery, promoting the dynamics of lithium-ions in the electrode sheet, and improving battery cycle performance.

DESCRIPTION OF EMBODIMENTS

Negative Electrode Sheet

As mentioned above, the present disclosure provides a negative electrode sheet including a negative electrode current collector and a negative electrode active material layer coated on one or both surfaces of the negative electrode current collector. The negative electrode active material layer includes a negative electrode active material, a conductive agent, a binder, and an auxiliary agent, where the negative electrode active material includes a silicon-based material; the auxiliary agent is selected from at least one of a compound represented by Formula 1:

Formula 1

$$R_1—R—M—R'—R'_1,$$

in Formula 1, M is selected from a polyphenylene ether chain segment, a polyethylene glycol chain segment, a polyethanedithiol chain segment, a polycarbonate chain segment, a polypropylene glycol chain segment, or a polysiloxane chain segment; each of $R_1$ and $R'_1$ is a terminal group, and at least one of $R_1$ and $R'_1$ includes a carbon-carbon double bond or a carbon-carbon triple bond as the terminal group; each of R and R' is a linking group.

In an embodiment of the present disclosure, each of $R_1$ and $R'_1$ is a terminal group, and at least one of $R_1$ and $R'_1$ includes at least one of the following groups as the terminal group: $—O—(C{=}O)—C(R_2){=}C(R'_2)(R'_2)$, $—N(R_3)—(C{=}O)—C(R_2){=}C(R'_2)(R'_2)$, $—C(R_2){=}C(R'_2)(R'_2)$, $—C{\equiv}C—R'_2$; where $R_2$ is selected from H or an organic functional group (such as $C_{1-12}$ alkyl, $C_{3-20}$ cycloalkyl, 3-20 membered heterocyclic group, $C_{6-18}$ aryl, 5-20 membered heteroaryl, bridged ring group formed by $C_{3-20}$ cycloalkyl and $C_{3-20}$ cycloalkyl, bridged ring group formed by $C_{3-20}$ cycloalkyl and 3-20 membered heterocyclic group, bridged ring group formed by 3-20 membered heterocyclic group and 3-20 membered heterocyclic group); $R'_2$ are the same or different, and independently selected from H or an organic functional group (such as $C_{1-12}$ alkyl, $C_{3-20}$ cycloalkyl, 3-20 membered heterocyclic group, $C_{6-18}$ aryl, 5-20 membered heteroaryl, bridged ring group formed by $C_{3-20}$ cycloalkyl and $C_{3-20}$ cycloalkyl, bridged ring group formed by $C_{3-20}$ cycloalkyl and 3-20 membered heterocyclic group, bridged ring group formed by 3-20 membered heterocyclic group and 3-20 membered heterocyclic group); $R_3$ is selected from H or $C_{1-3}$ alkyl.

In an embodiment of the present disclosure, one or both of $R_1$ and $R'_1$ include one or two of the following groups as the terminal groups: $—O—(C{=}O)—C(R_2){=}C(R'_2)(R'_2)$, $—N(R_3)—(C{=}O)—C(R_2){=}C(R'_2)(R'_2)$, $—C(R_2){=}C(R'_2)(R'_2)$, $—C{\equiv}C—R'_2$; where $R_2$ is selected from H or $C_{1-6}$ alkyl (for example, selected from H or $C_{1-3}$ alkyl; for another example, selected from H or methyl); $R'_2$ are the same or different, and independently selected from H or $C_{1-6}$ alkyl (for example, selected from H or $C_{1-3}$ alkyl; for another example, selected from H or methyl); $R_3$ is selected from H or $C_{1-3}$ alkyl.

In an embodiment of the present disclosure, R and R' are the same or different, and independently selected from absent, alkylene, where $R_3$ is H or $C_{1-3}$ alkyl.

In an implementation, R and R' are the same or different, and independently selected from absent, $—CH_2—$, $—CH_2CH_2—$, —NH—, $—N(CH_3)—$, or $—N(CH_2CH_3)—$.

In an embodiment of the present disclosure, the polyphenylene ether chain segment has a repeating unit represented by Formula 2:

Formula 2

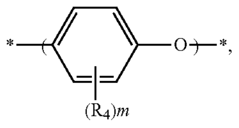

in Formula 2, $R_4$ is selected from H or $C_{1-6}$ alkyl, and m is an integer between 0 and 4. For example, $R_4$ is selected from H or $C_{1-3}$ alkyl, and m is an integer between 0 and 2.

Specifically, the polyphenylene ether chain segment has a repeating unit represented by Formula 2':

Formula 2'

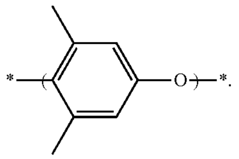

In an embodiment of the present disclosure, the polyethylene glycol chain segment has a repeating unit represented by Formula 3:

Formula 3

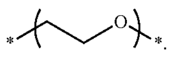

In an embodiment of the present disclosure, the polypropylene glycol chain segment has a repeating unit represented by Formula 4:

Formula 4

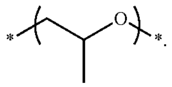

In an embodiment of the present disclosure, the polyethanedithiol chain segment has a repeating unit represented by Formula 5:

Formula 5

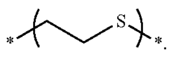

In an embodiment of the present disclosure, the polycarbonate chain segment has a repeating unit represented by Formula 6:

Formula 6

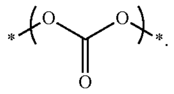

In an embodiment of the present disclosure, the polysiloxane chain segment has a repeating unit represented by Formula 7:

Formula 7

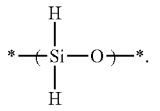

In an embodiment of the present disclosure, M has a number-average molecular weight of 100-30000.

In an embodiment of the present disclosure, the compound represented by Formula 1 has a number-average molecular weight of 200-30000, in an implementation, the compound represented by Formula 1 has a number-average molecular weight of 300-10000.

In an embodiment of the present disclosure, the compound represented by Formula 1 is selected from at least one of polyethanedithiol acrylate, polyethanedithiol methacrylate, polyethanedithiol diacrylate, polyethanedithiol dimethyl acrylate, polyethanedithiol phenyl ether acrylate, polyethanedithiol monoallyl ether, polyethylene glycol acrylate, polyethylene glycol methacrylate, polyethylene glycol diacrylate, polyethylene glycol dimethacrylate, polyethylene glycol phenyl ether acrylate, polyethylene glycol monoallyl ether, polycarbonate acrylate, polycarbonate methacrylate, polycarbonate diacrylate, polycarbonate dimethyl acrylate, polycarbonate phenyl ether acrylate, polycarbonate monoallyl ether, polypropylene glycol acrylate, polypropylene glycol methacrylate, polypropylene glycol diacrylate, polypropylene glycol dimethacrylate, polypropylene glycol phenyl ether acrylate, polypropylene glycol monoallyl ether, polysiloxane acrylate, polysiloxane methacrylate, polysiloxane diacrylate, polysiloxane dimethyl acrylate, polysiloxane phenyl ether acrylate, and polysiloxane monoallyl ether.

Exemplarily, the auxiliary agent is selected from at least one of the compounds represented by Formulas 1-1, 1-2, 1-3, 1-4, 1-5, 1-6, 1-7, and 1-8:

Formula 1-1

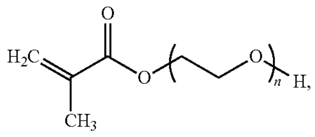

Formula 1-2

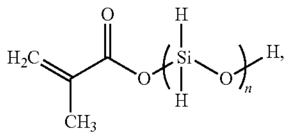

-continued

Formula 1-3

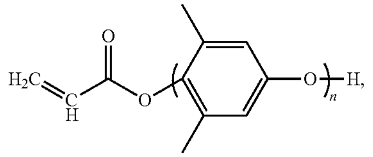

Formula 1-4

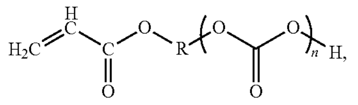

Formula 1-5

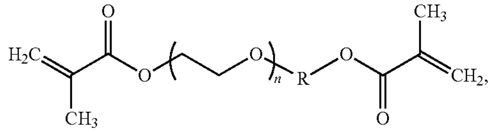

Formula 1-6

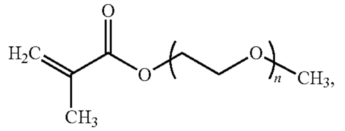

Formula 1-7

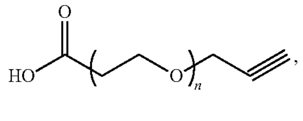

Formula 1-8

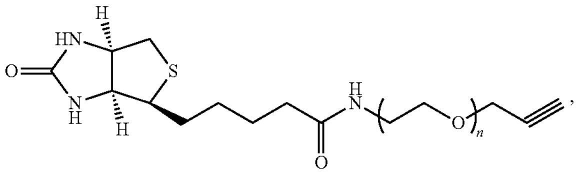

in Formulas 1-1 to 1-8, n is the number of the repeating unit, n are the same or different in each of the Formulas; for example, n is an integer between 2 and 680;

in Formulas 1-4 and 1-5, R is a linking group as defined above.

The compound represented by Formula 1-7 is, for example, propargyl-PEG4-acid (CAS: 1415800-32-6); the compound represented by Formula 1-8 is, for example, biotin-PEG4-alkyne (CAS: 1262681-31-1).

In the present disclosure, the auxiliary agent can be prepared using a conventional method in the art or purchased commercially.

In an embodiment of the present disclosure, the negative electrode active material layer includes components with mass percentage contents as following:

75-98 wt % of the negative electrode active material, 1-15 wt % of the conductive agent, 0.999-10 wt % of the binder, and 0.001-2 wt % of the auxiliary agent.

Exemplarily, the mass percentage content of the negative electrode active material is 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, or 98 wt %.

Exemplarily, the mass percentage content of the conductive agent is 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %.

Exemplarily, the mass percentage content of the auxiliary agent is 0.001 wt %, 0.05 wt %, 0.1 wt %, 0.15 wt %, 0.25 wt %, 0.55 wt %, 0.65 wt %, 0.70 wt %, 0.75 wt %, 0.85 wt %, 0.90 wt %, 1.0 wt %, 1.2 wt %, 1.5 wt %, or 2 wt %. When the content of the auxiliary agent is greater than 2 wt %, the excessive content of the auxiliary agent will lead to a decrease of the negative electrode active material, resulting in low capacity of the electrode sheet and poor network for conducting lithium ions and electrons inside the electrode sheet, and thereby, affecting battery performance and failing to meet application conditions. When the content of the auxiliary agent is less than 0.001 wt %, the too low content of the auxiliary agent will lead to a poor forming property, and thus, the structure of the solid electrolyte interphase film on the surface of the negative electrode is unstable, thereby reducing battery performance.

Exemplarily, the mass percentage content of the binder is 0.999 wt %, 1 wt %, 2 wt %, 3 wt %, 4 wt %, 5 wt %, 6 wt %, 7 wt %, 8 wt %, 9 wt %, or 10 wt %.

In an embodiment of the present disclosure, the silicon-based material is selected from at least one of nano silicon, $SiO_x$ ($0<x<2$), aluminum-silicon alloy, magnesium-silicon alloy, boron-silicon alloy, phosphorus-silicon alloy, and lithium-silicon alloy.

In an embodiment of the present disclosure, the negative electrode active material further includes a carbon-based material, and the carbon-based material is selected from at least one of artificial graphite, natural graphite, hard carbon, soft carbon, mesocarbon microbead, fullerene, and graphene.

In an embodiment of the present disclosure, the conductive agent is selected from one or more of conductive carbon black, Ketjen black, electroconductive fiber, conductive polymer, acetylene black, carbon nanotube, graphene, flake graphite, conductive oxide, and metal particle.

In an embodiment of the present disclosure, the binder is selected from at least one of polyvinylidene fluoride and its copolymer derivatives, polytetrafluoroethylene and its copolymer derivatives, polyacrylic acid and its copolymer derivatives, polyvinyl alcohol and its copolymer derivatives, polybutadiene styrene rubber and its copolymer derivatives, polyimide and its copolymer derivatives, polyethyleneimine and its copolymer derivatives, polyacrylate and its copolymer derivatives, or carboxymethyl cellulose sodium and its copolymer derivatives.

In an embodiment of the present disclosure, the negative electrode sheet has a surface density of 0.2-15 $mg/cm^2$.

According to the present disclosure, the negative electrode current collector has a thickness of 3 μm-15 μm, in an implementation, the negative electrode current collector has a thickness of 4 μm-10 μm, for example, 3 μm, 4 μm, 5 μm, 8 μm, 10 μm, 12 μm or 15 μm.

According to the present disclosure, the negative electrode active material layer (after rolling) has a thickness of 20 μm-200 μm, in an implementation, the negative electrode active material layer (after rolling) has a thickness of 30 μm-150 μm, for example, 20 μm, 25 μm, 30 μm, 35 μm, 40 μm, 45 μm, 50 μm, 55 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm.

Method for Preparing a Negative Electrode Sheet

The present disclosure further provides a method for preparing a negative electrode sheet, including the following steps:

mixing a solvent, a negative electrode active material, a conductive agent, a binder, and at least one compound represented by Formula 1 uniformly to prepare a negative electrode slurry; coating the negative electrode slurry on a surface of a negative electrode current collector, and drying to prepare the negative electrode sheet.

In an embodiment of the present disclosure, the negative electrode slurry includes 100-600 parts by mass of the solvent, 75-98 parts by mass of the negative electrode active material, 1-15 parts by mass of the conductive agent, 0.001-2 parts by mass of the at least one compound represented by Formula 1, and 0.999-10 parts by mass of the binder.

In an embodiment of the present disclosure, the solvent is selected from at least one of water, acetonitrile, benzene, toluene, xylene, acetone, tetrahydrofuran, hydrofloroether, and N-methylpyrrolidone.

In an embodiment of the present disclosure, the negative electrode slurry is a negative electrode slurry that has been subjected to sieving, for example, with a 200-mesh sieve.

In an embodiment of the present disclosure, the temperature of drying treatment is 50° C.-110° C., and the time of drying treatment is 6-36 h.

Lithium-Ion Battery

The present disclosure further provides a lithium-ion battery including the above negative electrode sheet.

The following will provide a further detailed description of the present disclosure in conjunction with specific embodiments. It should be understood that the following embodiments are only illustrative illustrations and explanations of the present disclosure, and should not be interpreted as limiting the protection scope of the present disclosure. All technologies implemented based on the above content of the present disclosure fall within the scope intended to be protected by the present disclosure.

The experimental methods used in the following examples are conventional methods unless otherwise specified; the reagents, materials, etc. used in the following examples can be obtained commercially unless otherwise specified.

Example 1

1) Preparation of a Positive Electrode Sheet:

95 g of a positive electrode active material (nickel-cobalt-manganese ternary material (NCM811)), 2 g of a binder (polyvinylidene fluoride (PVDF)), 2 g of a conductive agent (conductive carbon black), and 1 g of the conductive agent (carbon nanotube) are mixed, 400 g of N-methylpyrrolidone (NMP) is added, they are stirred under a vacuum mixer until the mixed system forms a positive electrode slurry that is uniform and flowable. The positive electrode slurry is coated uniformly on an aluminum foil with a thickness of 12 μm, and after drying at 100° C. for 36 h and vacuum treating, an electrode sheet is obtained, and the electrode sheet is subjected to rolling and cutting to obtain the positive electrode sheet.

2) Preparation of a Negative Electrode Sheet:

75 g of silicon monoxide, 5 g of a conductive agent (single-walled carbon nanotube (SWCNT)), 10 g of the conductive agent (conductive carbon black (Super P Conductive Carbon Black)), 2 g of polyethylene glycol methyl methacrylate, 4 g of a binder (carboxymethylcellulose sodium (CMC)), 4 g of the binder (styrene butadiene rubber (SBR)), and 500 g of deionized water are prepared into a slurry using a wet process, the slurry is coated on a surface of a copper foil of a negative electrode current collector, and after drying, rolling and die-cutting, the negative electrode sheet is obtained.

3) Preparation of an Electrolyzing Solution:

ethylene carbonate, propylene carbonate, diethyl carbonate and n-propyl propionate are uniformly mixed in a proportion of 20:10:15:55 by mass ratio in a glove box which is filled with argon gas and in which the oxygen content in water is qualified, then 1 mol/L of fully dried lithium hexafluorophosphate (LiPF6) is quickly added thereto, they are stirred uniformly to prepare the electrolyzing solution.

4) Preparation of a Lithium-Ion Battery a lithium-ion battery cell is prepared by the obtained positive electrode sheet, negative electrode sheet, and a separating membrane, and is subjected to liquid injection and encapsulation, and welding to obtain the lithium-ion battery.

Comparative Example 1.1

Example 1 is referred to for the specific process of the Comparative Example 1.1, the main difference is that poly (polyethylene glycol methyl methacrylate) with the same mass as the polyethylene glycol methyl methacrylate monomer is used in Comparative Example 1.1. Polyethylene glycol methyl methacrylate and azodiisobutyronitrile, which have the same masses, are used for poly (polyethylene glycol methyl methacrylate), and are fully polymerized at 60° C., after polymerization, the polymer is added to Comparative Example 1.1 after C═C double bond peak cannot be detected in the polymer by infrared detection, other conditions are the same as Example 1.

Comparative Example 1.2

Example 1 is referred to for the specific process of Comparative Example 1.2, and the main difference is that the polyethylene glycol methyl methacrylate monomer is not added in Comparative Example 1.2, and other conditions are the same as Example 1.

Examples 2-6 and Other Comparative Examples

Example 1 is referred to for the specific processes of Examples 2-6 and other Comparative Examples, the main differences lie in process conditions for the negative electrode sheet, addition amounts of respective components, and types of respective component materials. Specific details are shown in Tables 1 and 2.

TABLE 1

Composition of the negative electrode sheet for Examples and Comparative Examples

| Serial number | Solvent/g | Negative electrode active material/g | Conductive agent/g | Polymer or its monomer/g | Binder/g | Drying temperature (° C.) | Drying time (h) |
|---|---|---|---|---|---|---|---|
| Example 1 | 400 | 75 | 15 | 2 | 8 | 95 | 20 |
| Comparative Example 1.1 | 400 | 75 | 15 | 2 | 8 | 95 | 20 |
| Comparative Example 1.2 | 400 | 75 | 15 | — | 8 | 95 | 20 |

TABLE 1-continued

Composition of the negative electrode sheet for Examples and Comparative Examples

| Serial number | Solvent/g | Negative electrode active material/g | Conductive agent/g | Polymer or its monomer/g | Binder/g | Drying temperature (° C.) | Drying time (h) |
|---|---|---|---|---|---|---|---|
| Example 2 | 300 | 98 | 1 | 0.001 | 0.999 | 105 | 24 |
| Comparative Example 2.1 | 300 | 98 | 1 | 0.001 | 0.999 | 105 | 24 |
| Comparative Example 2.2 | 300 | 98 | 1 | — | 0.999 | 105 | 24 |
| Example 3 | 400 | 85 | 7 | 1 | 7 | 90 | 30 |
| Comparative Example 3.1 | 400 | 85 | 7 | 1 | 7 | 90 | 30 |
| Comparative Example 3.2 | 400 | 85 | 4 | — | 4 | 90 | 30 |
| Example 4 | 500 | 90.5 | 6 | 1.5 | 2 | 95 | 24 |
| Comparative Example 4.1 | 500 | 90.5 | 6 | 1.5 | 2 | 95 | 24 |
| Comparative Example 4.2 | 500 | 90.5 | 6 | — | 2 | 95 | 24 |
| Example 5 | 450 | 89 | 7.5 | 0.5 | 3 | 100 | 12 |
| Comparative Example 5.1 | 450 | 89 | 7.5 | 0.5 | 3 | 100 | 12 |
| Comparative Example 5.2 | 450 | 89 | 7.5 | — | 3 | 100 | 12 |
| Example 6 | 600 | 88 | 7.3 | 0.2 | 4.5 | 85 | 30 |
| Comparative Example 6.1 | 600 | 88 | 7.3 | 0.2 | 4.5 | 85 | 30 |
| Comparative Example 6.2 | 600 | 88 | 7.3 | — | 4.5 | 85 | 30 |

TABLE 2

Composition of the negative electrode sheet for Examples and Comparative Examples

| Serial number | Negative electrode active material | Conductive agent | Polymer monomer/polymer | Binder |
|---|---|---|---|---|
| Example 1 | Silicon monoxide | Conductive carbon black + Carbon nanotube (2:1) | Polyethylene glycol methyl methacrylate (molecular weight of monomer 300) | Sodium carboxymethyl cellulose + Styrene butadiene rubber (1:1) |
| Comparative Example 1.1 | | | Poly (polyethylene glycol methyl methacrylate) | |
| Comparative Example 1.2 | | | — | |
| Example 2 | Silicon + Silicon monoxide (2:5) | Conductive carbon black + Ketjen black (2:1) | Polyphenylene ether acrylate (molecular weight of monomer 500) | Sodium carboxymethyl cellulose + Styrene-acrylic rubber (1:1) |
| Comparative Example 2.1 | | | Poly (polyphenylene ether acrylate) | |
| Comparative Example 2.2 | | | — | |
| Example 3 | Silicon + Silicon monoxide (1:1) | Conductive fiber + Carbon nanotube (1:1) | Polycarbonate acrylate (molecular weight of monomer 1500) | Sodium polyacrylate + Styrene butadiene rubber (1:1.5) |
| Comparative Example 3.1 | | | Poly (polycarbonate acrylate) | |
| Comparative Example 3.2 | | | — | |
| Example 4 | Silicon monoxide + Silicon (4:1) | Carbon nanotube + Graphene (1:2) | Polyethylene glycol methyl methacrylate (molecular weight of monomer 1000) | Sodium carboxymethyl cellulose + Polybutadiene styrene rubber (1:1) |
| Comparative Example 4.1 | | | Poly (polyethylene glycol methyl methacrylate) | |
| Comparative Example 4.2 | | | — | |
| Example 5 | Silicon monoxide + Silicon (5:1) | Conductive carbon black + Carbon nanotube (2:1) | Polysiloxane methyl methacrylate (molecular weight of monomer 600) | Polyacrylate + Polyacrylic acid (1.5:1) |
| Comparative Example 5.1 | | | Poly (silicone ether methyl methacrylate) | |
| Comparative Example 5.2 | | | — | |
| Example 6 | Silicon monoxide + Silicon (4:1) | Carbon nanotube + Graphene (1:2) | Polyethylene glycol dimethyl acrylate methyl ester (molecular weight of monomer 1000) | Sodium carboxymethyl cellulose + Styrene butadiene rubber (1:1) |
| Comparative Example 6.1 | | | Poly (polyethylene glycol dimethyl acrylate) | |
| Comparative Example 6.2 | | | — | |

Where, the proportions in parentheses, unless otherwise specified, are all mass ratios. For example, the meaning of conductive carbon black + carbon nanotube (2:1) is that the mass ratio of conductive carbon black to carbon nanotube is 2:1.

The performance test is performed on the batteries prepared by the above Examples and Comparative Examples.

(1) AC Impedance-based Battery Internal Resistance Test Method: Metrohm PGSTAT302N Chemical Workstation is used, the AC impedance test is conducted on a 50% SOC lithium-ion battery in the range of 100 KHz-0.1 mHz at 25° C., the results of the test are listed in Table 3.

TABLE 3

Results of AC impedance-based battery internal resistance test for Examples and Comparative Examples

| Serial number | Battery internal resistance after 100 cycles (mΩ) | Battery internal resistance after 200 cycles (mΩ) | Battery internal resistance after 300 cycles (mΩ) | Battery internal resistance after 400 cycles (mΩ) |
|---|---|---|---|---|
| Example 1 | 3.65 | 3.73 | 4.18 | 4.89 |
| Comparative Example 1.1 | 4.85 | 5.08 | 5.54 | 6.61 |
| Comparative Example 1.2 | 5.86 | 6.46 | 7.42 | 9.11 |
| Example 2 | 1.81 | 2.06 | 2.52 | 3.28 |
| Comparative Example 2.1 | 2.32 | 2.81 | 3.63 | 4.84 |
| Comparative Example 2.2 | 2.62 | 3.43 | 5.19 | 7.34 |
| Example 3 | 4.12 | 4.71 | 5.81 | 7.73 |
| Comparative Example 3.1 | 5.31 | 6.59 | 8.13 | 10.19 |
| Comparative Example 3.2 | 5.72 | 6.93 | 8.21 | 10.33 |
| Example 4 | 2.63 | 2.75 | 3.03 | 3.71 |
| Comparative Example 4.1 | 3.35 | 3.78 | 4.19 | 5.28 |
| Comparative Example 4.2 | 3.71 | 4.10 | 4.75 | 6.04 |
| Example 5 | 2.41 | 2.89 | 3.63 | 4.82 |
| Comparative Example 5.1 | 2.95 | 3.68 | 4.97 | 6.82 |
| Comparative Example 5.2 | 3.05 | 3.77 | 5.06 | 6.79 |
| Example 6 | 1.93 | 2.01 | 2.15 | 2.57 |
| Comparative Example 6.1 | 3.45 | 3.81 | 4.37 | 5.52 |
| Comparative Example 6.2 | 3.61 | 4.07 | 4.80 | 5.97 |

The results of the internal resistance test during the battery cycling process indicate that the lithium-ion batteries prepared by the Examples of the present disclosure have an internal resistance smaller than that of the lithium-ion batteries prepared by the Comparative Examples. The main reason is that the auxiliary agent added in the present disclosure can form a solid electrolyte interphase film on the surface of the silicon-based material. The solid electrolyte interphase film is different from solid electrolyte interphase films on surfaces of conventional silicon-based materials, and has the functional characteristics that the polymer component has a high content and high molecular weight, and conducts lithium-ions in a high speed, and so on, therefore, lithium-ions can be quickly conducted to pass through, and the prepared lithium-ion battery has a lower internal resistance, at the same time, the increase of internal resistance of the lithium-ion battery is small during cycling, and thus, it has a good application prospect.

(2) Battery cycling performance test method: lithium-ion batteries are subjected to a charging and discharging cycling test on a blue battery charging and discharging test cabinet under the test conditions of 25° C., 0.5 C/0.5 C charging and discharging, and the results of the test are listed in Table 4.

TABLE 4

Results of battery cycling performance test for Examples and Comparative Examples

| Serial number | Capacity retention rate of battery after 100 cycles (%) | Capacity retention rate of battery after 300 cycles (%) | Capacity retention rate of battery after 500 cycles (%) | Capacity retention rate of battery after 700 cycles (%) |
|---|---|---|---|---|
| Example 1 | 98.51 | 94.71 | 90.46 | 87.62 |
| Comparative Example 1.1 | 97.52 | 91.34 | 86.57 | 82.42 |
| Comparative Example 1.2 | 96.51 | 88.62 | 81.68 | 75.31 |
| Example 2 | 98.61 | 95.23 | 92.83 | 90.74 |
| Comparative Example 2.1 | 97.56 | 94.73 | 91.43 | 89.37 |
| Comparative Example 2.2 | 97.43 | 94.58 | 91.18 | 88.54 |
| Example 3 | 96.65 | 90.34 | 83.43 | 76.53 |
| Comparative Example 3.1 | 95.64 | 87.74 | 79.12 | 70.43 |
| Comparative Example 3.2 | 94.83 | 85.54 | 75.51 | 65.15 |
| Example 4 | 98.61 | 95.71 | 92.38 | 90.03 |
| Comparative Example 4.1 | 98.23 | 94.51 | 90.12 | 86.23 |
| Comparative Example 4.2 | 97.12 | 92.93 | 88.78 | 83.15 |
| Example 5 | 98.49 | 95.01 | 91.04 | 88.82 |
| Comparative Example 5.1 | 97.21 | 92.11 | 87.89 | 83.62 |
| Comparative Example 5.2 | 96.15 | 89.25 | 86.65 | 81.56 |
| Example 6 | 98.64 | 95.95 | 93.43 | 91.52 |
| Comparative Example 6.1 | 97.56 | 95.43 | 89.95 | 85.92 |
| Comparative Example 6.2 | 97.35 | 92.72 | 88.76 | 83.82 |

The results of the cycling performance test for the above Examples and Comparative Examples indicate that the lithium-ion batteries prepared by the Examples of the present disclosure have a capacity retention rate higher than that of the lithium-ion batteries prepared by the Comparative Examples during the cycling process. The main reason is that the auxiliary agent added in the present disclosure can form a solid electrolyte interphase film on the surface of the silicon-based material. The solid electrolyte interphase film is different from solid electrolyte interphase films on surfaces of conventional silicon-based materials, and has the functional characteristics that the polymer component has a high content and high molecular weight, and conducts lithium-ions in a high speed, and so on. For a solid electrolyte interphase film of a conventional silicon-based material, along with the alloying and dealloying of lithium-ions in the battery cycling process, irregular volume expansion appears on the surface of the silicon-based material, thus, more new interphases are generated, and the new interphases consume electrolyzing solution and lithium salt, and the solid electrolyte interphase film continues to form, thereby reducing battery performance. In the present disclosure, due to the addition of the auxiliary agent, a more stable solid electrolyte interphase film with higher property of conducting lithium-ions can be formed on the surface of the silicon-based material, thereby greatly improving the performance of the silicon-based negative electrode.

The results of the cycling charging and discharging performance test for the above Examples and Comparative Examples indicate that the silicon-based material negative electrode sheet prepared by the present disclosure has a low internal resistance during the cycling process, and there are good channels in the silicon-based material negative electrode sheet for conducting lithium-ions and electrons, and thus, the prepared lithium-ion battery has good cycling performance.

Example 7

1) Preparation of a Positive Electrode Sheet:

95 g of a positive electrode active material (lithium cobalt oxide), 2 g of a binder (polyvinylidene fluoride (PVDF)), 2 g of a conductive agent (conductive carbon black), and 1 g of the conductive agent (carbon nanotube) are mixed, 400 g of N-methylpyrrolidone (NMP) is added, and they are stirred under a vacuum mixer until the mixed system forms a positive electrode slurry that is uniform and flowable. The positive electrode slurry is coated uniformly on an aluminum foil with a thickness of 12 μm, and after drying at 100° C. for 36 h and vacuum treating, an electrode sheet is obtained, then the electrode sheet is subjected to rolling and cutting to obtain the positive electrode sheet.

2) Preparation of a Negative Electrode Sheet:

25 g of silicon monoxide, 50 g of graphite, 5 g of a conductive agent (single-walled carbon nanotube (SWCNT)), 10 g of the conductive agent (conductive carbon black (Super P Conductive Carbon Black)), 2 g of polyethylene glycol methyl methacrylate, 4 g of a binder (carboxymethylcellulose sodium (CMC)), 4 g of the binder (styrene butadiene rubber (SBR)), and 500 g of deionized water are prepared into a slurry using a wet process, the slurry is coated on a surface of a copper foil of a negative electrode current collector, and after drying, rolling, and die-cutting, the negative electrode sheet is obtained.

3) Preparation of an Electrolyzing Solution:

ethylene carbonate, propylene carbonate, diethyl carbonate and n-propyl propionate are uniformly mixed in a proportion of 20:10:15:55 by mass ratio in a glove box which is filled with argon gas and in which the oxygen content in water is qualified, then 1 mol/L of fully dried lithium hexafluorophosphate (LiPF6) is quickly added thereto, they are stirred uniformly to prepare the electrolyzing solution.

4) Preparation of a Lithium-Ion Battery a lithium-ion battery cell is prepared by the obtained positive electrode sheet, negative electrode sheet, and a separating membrane (a polyethylene separating membrane), and is subjected to liquid injection and encapsulation, and welding to obtain the lithium-ion battery.

Comparative Example 7.1

Example 7 is referred to for the specific process of the Comparative Example 7.1, the main difference is that poly (polyethylene glycol methyl methacrylate) with the same mass as the polyethylene glycol methyl methacrylate monomer is used in Comparative Example 7.1. Polyethylene glycol methyl methacrylate and azodiisobutyronitrile, which have the same masses, are used for poly (polyethylene glycol methyl methacrylate), and are fully polymerized at 60° C., after polymerization, the polymer is added to Comparative Example 7.1 after C═C double bond peak cannot be detected in the polymer by infrared detection, other conditions are the same as Example 7.

Comparative Example 7.2

Example 7 is referred to for the specific process of Comparative Example 7.2, and the main difference is that the polyethylene glycol methyl methacrylate monomer is not added in Comparative Example 7.2, and other conditions are the same as Example 7.

Examples 8-12 and Other Comparative Examples

Example 7 is referred to for the specific processes of Examples 8-12 and other Comparative Examples, the main differences lie in process conditions for the negative electrode sheet, addition amounts of respective components, and types of respective component materials. Specific details are shown in Tables 5 and 6.

TABLE 5

Composition of the negative electrode sheet for Examples and Comparative Examples

| Serial number | Solvent/g | Negative electrode active material/g | Conductive agent/g | Polymer or its monomer/g | Binder/g | Drying temperature (° C.) | Drying time (h) |
|---|---|---|---|---|---|---|---|
| Example 7 | 300 | 75 | 15 | 2 | 8 | 95 | 18 |
| Comparative Example 7.1 | 300 | 75 | 15 | 2 | 8 | 95 | 18 |
| Comparative Example 7.2 | 300 | 75 | 15 | — | 8 | 95 | 18 |

TABLE 5-continued

Composition of the negative electrode sheet for Examples and Comparative Examples

| Serial number | Solvent/g | Negative electrode active material/g | Conductive agent/g | Polymer or its monomer/g | Binder/g | Drying temperature (° C.) | Drying time (h) |
|---|---|---|---|---|---|---|---|
| Example 8 | 250 | 98 | 1 | 0.001 | 0.999 | 85 | 20 |
| Comparative Example 8.1 | 250 | 98 | 1 | 0.001 | 0.999 | 85 | 20 |
| Comparative Example 8.2 | 250 | 98 | 1 | — | 0.999 | 85 | 20 |
| Example 9 | 200 | 85 | 7 | 1 | 7 | 90 | 30 |
| Comparative Example 9.1 | 200 | 85 | 7 | 1 | 7 | 90 | 30 |
| Comparative Example 9.2 | 200 | 85 | 4 | — | 4 | 90 | 30 |
| Example 10 | 100 | 90.5 | 6 | 1.5 | 2 | 95 | 24 |
| Comparative Example 10.1 | 100 | 90.5 | 6 | 1.5 | 2 | 95 | 24 |
| Comparative Example 10.2 | 100 | 90.5 | 6 | — | 2 | 95 | 24 |
| Example 11 | 250 | 89 | 7.5 | 0.5 | 3 | 100 | 30 |
| Comparative Example 11.1 | 250 | 89 | 7.5 | 0.5 | 3 | 100 | 30 |
| Comparative Example 11.2 | 250 | 89 | 7.5 | — | 3 | 100 | 30 |
| Example 12 | 200 | 88 | 7.3 | 0.2 | 4.5 | 105 | 15 |
| Comparative Example 12.1 | 200 | 88 | 7.3 | 0.2 | 4.5 | 105 | 15 |
| Comparative Example 12.2 | 200 | 88 | 7.3 | — | 4.5 | 105 | 15 |

TABLE 6

Composition of the negative electrode sheet for Examples and Comparative Examples

| Serial number | Negative electrode active material | Conductive agent | Polymer monomer/polymer | Binder |
|---|---|---|---|---|
| Example 7 | Silicon monoxide + Graphite (1:2) | Carbon nanotube + Conductive carbon black (1:2) | Polyethylene glycol methyl methacrylate (molecular weight of monomer 300) | Sodium carboxymethyl cellulose + Styrene butadiene rubber (1:1) |
| Comparative Example 7.1 | | | Poly (polyethylene glycol methyl methacrylate) | |
| Comparative Example 7.2 | | | — | |
| Example 8 | Silicon + Silicon monoxide + Graphite (2:5:9) | Conductive carbon black + Ketjen black (2:1) | Polyphenylene ether acrylate (molecular weight of monomer 500) | Sodium carboxymethyl cellulose + Styrene-acrylic rubber (1:1) |
| Comparative Example 8.1 | | | Poly (polyphenylene ether acrylate) | |
| Comparative Example 8.2 | | | — | |
| Example 9 | Silicon + Silicon monoxide + Graphite (1:1:5) | Conductive fiber + Carbon nanotube (1:1) | Polycarbonate acrylate (molecular weight of monomer 1500) | Polyacrylate + Styrene butadiene rubber (1:1.5) |
| Comparative Example 9.1 | | | Poly (polycarbonate acrylate) | |
| Comparative Example 9.2 | | | — | |
| Example 10 | Graphite + Silicon (4:1) | Carbon nanotube + Graphene (5:2) | Polyethylene glycol methyl methacrylate (molecular weight of monomer 1000) | Sodium carboxymethyl cellulose + Styrene butadiene rubber (1:1) |
| Comparative Example 10.1 | | | Poly (polyethylene glycol methyl methacrylate) | |
| Comparative Example 10.2 | | | — | |
| Example 11 | Silicon monoxide + Graphite (5:1) | Conductive carbon black + Carbon nanotube (5:1) | Polysiloxane methyl methacrylate (molecular weight of monomer 600) | Polyacrylate + Polyacrylic acid (1.5:1) |
| Comparative Example 11.1 | | | Poly (silicone ether methyl methacrylate) | |
| Comparative Example 11.2 | | | — | |
| Example 12 | Silicon monoxide + Graphite (1:7) | Carbon nanotube + Graphene (1:2) | Polyethylene glycol dimethyl acrylate methyl ester (molecular weight of monomer 1000) | Sodium carboxymethyl cellulose + Styrene butadiene rubber (1:1) |
| Comparative Example 12.1 | | | Poly (polyethylene glycol dimethyl acrylate) | |
| Comparative Example 12.2 | | | — | |

Where, the proportions in parentheses, unless otherwise specified, are all mass ratios. For example, the meaning of carbon nanotube + conductive carbon black (1:2) is that the mass ratio of carbon nanotube to conductive carbon black is 1:2.

The performance test is performed on the batteries prepared by the above Examples and Comparative Examples:

(3) AC Impedance-based Battery Internal Resistance Test Method: Metrohm PGSTAT302N Chemical Workstation is used, the AC impedance test is conducted on a 50% SOC lithium-ion battery in the range of 100 KHz-0.1 mHz at 25° C., the results of the test are listed in Table 7.

The results of the internal resistance test during the battery cycling process indicate that the lithium-ion batteries prepared by the Examples of the present disclosure have an internal resistance smaller than that of the lithium-ion batteries prepared by the Comparative Examples. The main reason is that the auxiliary agent added in the present disclosure can form a solid electrolyte interphase film on the surface of the silicon-based material. The solid electrolyte interphase film is different from solid electrolyte interphase films on surfaces of conventional silicon-based materials, and has the functional characteristics that the polymer component has a high content and high molecular weight, and conducts lithium-ions in a high speed, and so on, therefore, lithium-ions can be quickly conducted to pass through, and the prepared lithium-ion battery has a lower internal resistance, at the same time, the increase of internal resistance of the lithium-ion battery is small during cycling, and thus, it has a good application prospect.

TABLE 7

Results of AC impedance-based battery internal resistance test for Examples and Comparative Examples

| Serial number | Battery internal resistance after 100 cycles (mΩ) | Battery internal resistance after 200 cycles (mΩ) | Battery internal resistance after 300 cycles (mΩ) | Battery internal resistance after 400 cycles (mΩ) |
|---|---|---|---|---|
| Example 7 | 3.51 | 3.82 | 4.34 | 5.25 |
| Comparative Example 7.1 | 4.92 | 5.26 | 5.86 | 7.34 |
| Comparative Example 7.2 | 6.12 | 6.74 | 7.82 | 9.64 |
| Example 8 | 1.21 | 2.51 | 3.13 | 4.38 |
| Comparative Example 8.1 | 2.71 | 3.42 | 4.33 | 5.62 |
| Comparative Example 8.2 | 3.21 | 4.35 | 6.39 | 8.91 |
| Example 9 | 4.35 | 5.15 | 6.57 | 8.93 |
| Comparative Example 9.1 | 5.78 | 7.17 | 9.23 | 12.31 |
| Comparative Example 9.2 | 6.23 | 8.86 | 10.47 | 14.37 |
| Example 10 | 2.81 | 3.15 | 3.75 | 4.91 |
| Comparative Example 10.1 | 3.75 | 3.39 | 5.23 | 6.88 |
| Comparative Example 10.2 | 4.21 | 4.91 | 5.85 | 7.94 |
| Example 11 | 2.61 | 3.29 | 4.27 | 6.02 |
| Comparative Example 11.1 | 3.35 | 3.98 | 5.96 | 8.52 |
| Comparative Example 11.2 | 3.65 | 4.27 | 6.26 | 9.72 |
| Example 12 | 2.13 | 2.51 | 3.15 | 4.37 |
| Comparative Example 12.1 | 3.85 | 4.52 | 6.31 | 9.12 |
| Comparative Example 12.2 | 4.67 | 6.21 | 8.84 | 12.52 |

(4) Battery cycling performance test method: lithium-ion batteries are subjected to a charging and discharging cycling test on a blue battery charging and discharging test cabinet under the test conditions of 25° C., 0.5 C/0.5 C charging and discharging, and the results of the test are listed in Table 8.

TABLE 8

Results of battery cycling performance test for Examples and Comparative Examples

| Serial number | Capacity retention rate of battery after 100 cycles (%) | Capacity retention rate of battery after 300 cycles (%) | Capacity retention rate of battery after 500 cycles (%) | Capacity retention rate of battery after 700 cycles (%) |
|---|---|---|---|---|
| Example 7 | 99.11 | 98.31 | 96.42 | 93.82 |
| Comparative Example 7.1 | 98.52 | 96.36 | 93.59 | 89.82 |
| Comparative Example 7.2 | 97.21 | 94.63 | 90.78 | 83.37 |
| Example 8 | 98.27 | 96.32 | 93.32 | 89.64 |
| Comparative Example 8.1 | 97.53 | 94.54 | 90.74 | 85.75 |
| Comparative Example 8.2 | 96.21 | 92.86 | 87.58 | 83.53 |
| Example 9 | 99.55 | 98.32 | 96.57 | 93.76 |
| Comparative Example 9.1 | 98.37 | 96.75 | 93.34 | 89.21 |
| Comparative Example 9.2 | 97.75 | 94.21 | 90.75 | 84.43 |
| Example 10 | 98.86 | 95.86 | 92.42 | 90.32 |
| Comparative Example 10.1 | 97.54 | 93.53 | 90.54 | 87.32 |
| Comparative Example 10.2 | 96.21 | 90.85 | 87.75 | 83.45 |
| Example 11 | 98.53 | 95.31 | 92.14 | 87.45 |
| Comparative Example 11.1 | 97.42 | 91.12 | 86.21 | 82.57 |
| Comparative Example 11.2 | 95.37 | 88.43 | 84.45 | 79.75 |
| Example 12 | 99.64 | 98.85 | 97.87 | 96.58 |
| Comparative Example 12.1 | 98.56 | 97.04 | 95.06 | 91.84 |
| Comparative Example 12.2 | 97.32 | 95.75 | 93.16 | 89.21 |

The results of the cycling performance test for the above Examples and Comparative Examples indicate that the lithium-ion batteries prepared by the Examples of the present disclosure have a capacity retention rate higher than that of the lithium-ion batteries prepared by the Comparative Examples during the cycling process. The main reason is that the auxiliary agent added in the present disclosure can form a solid electrolyte interphase film on the surface of the silicon-based material. The solid electrolyte interphase film is different from solid electrolyte interphase films on surfaces of conventional silicon-based materials, and has the functional characteristics that the polymer component has a high content and high molecular weight, and conducts lithium-ions in a high speed, and so on. For a solid electrolyte interphase film of a conventional negative electrode active material, along with the alloying and dealloying of lithium-ions in the battery cycling process, irregular volume expansion appears on the surface of the negative electrode active material, thus, more new interphases are generated, and the new interphases consume electrolyzing solution and lithium salt, and the solid electrolyte interphase film continues to form, thereby reducing battery performance. In the present disclosure, due to the addition of the auxiliary agent, a more stable solid electrolyte interphase film with higher property of conducting lithium-ions can be formed on the surface of the negative electrode active material, thereby greatly improving the performance of the silicon-based negative electrode.

The results of the cycling charging and discharging performance test for the above Examples and Comparative Examples indicate that the negative electrode sheet prepared by the present disclosure has a low internal resistance during the cycling process, and there are good channels in the negative electrode sheet for conducting lithium-ions and electrons, and thus, the prepared lithium-ion battery has good cycling performance.

The above describes the embodiments of the present disclosure. However, the present disclosure is not limited to the aforementioned embodiments. Any modifications, equivalent substitutions, improvements, etc. made within the spirit and principles of the present disclosure shall be included within the protection scope of the present disclosure.

What is claimed is:

1. A negative electrode sheet, comprising a negative electrode current collector, and a negative electrode active material layer coated on one or both surfaces of the negative electrode current collector, the negative electrode active material layer comprises a negative electrode active material, a conductive agent, a binder, and an auxiliary agent, wherein the negative electrode active material comprises a silicon-based material; the auxiliary agent is selected from at least one of a compound represented by Formula 1:

Formula 1

$$R_1—R—M—R'—R'_1,$$

in Formula 1, M is selected from a polyphenylene ether chain segment; each of $R_1$ and $R'_1$ is a terminal group, and at least one of $R_1$ and $R'_1$ comprises a carbon-carbon double bond or a carbon-carbon triple bond as the terminal group; each of R and R' is a linking group.

2. The negative electrode sheet according to claim 1, wherein each of $R_1$ and $R'_1$ is the terminal group, and at least one of $R_1$ and $R'_1$ comprises at least one of the following groups as the terminal group: —O—(C═O)—C($R_2$)═C($R'_2$)($R'_2$), —N($R_3$)—(C═O)—C($R_2$)═C($R'_2$)($R'_2$), —C($R_2$)═C($R'_2$)($R'_2$), —C≡C—$R'_2$; wherein $R_2$ is selected from H or an organic functional group; $R'_2$ are the same or different, and independently selected from H or an organic functional group; $R_3$ is selected from H or $C_{1-3}$ alkyl.

3. The negative electrode sheet according to claim 2, wherein one or both of $R_1$ and $R'_1$ comprise one or two of the following groups as the terminal group: —O—(C═O)—C($R_2$)═C($R'_2$)($R'_2$), —N($R_3$)—(C═O)—C($R_2$)═C($R'_2$)($R'_2$), —C($R_2$)═C($R'_2$)($R'_2$), —C≡C—$R'_2$; wherein $R_2$ is selected from H or $C_{1-6}$ alkyl; $R'_2$ are the same or different, and independently selected from H or $C_{1-6}$ alkyl; $R_3$ is selected from H or $C_{1-3}$ alkyl; and/or R and R' are the same or different, and independently selected from absent, alkylene, —$NR_3$—, wherein $R_3$ is H or $C_{1-3}$ alkyl.

4. The negative electrode sheet according to claim 3, wherein the polyphenylene ether chain segment has a repeating unit represented by Formula 2:

Formula 2

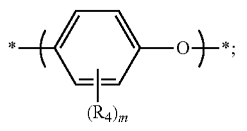

in Formula 2, $R_4$ is selected from H or $C_{1-6}$ alkyl, and m is an integer between 0 and 4.

5. The negative electrode sheet according to claim 1, wherein the compound represented by Formula 1 has a number-average molecular weight of 200-3000.

6. The negative electrode sheet according to claim 2, wherein the compound represented by Formula 1 has a number-average molecular weight of 200-3000.

7. The negative electrode sheet according to claim 3, wherein the compound represented by Formula 1 has a number-average molecular weight of 200-3000.

8. The negative electrode sheet according to claim 4, wherein the compound represented by Formula 1 has a number-average molecular weight of 200-3000.

9. The negative electrode sheet according to claim 1, wherein the negative electrode active material layer comprises components with mass percentage contents as following:

75-98 wt % of the negative electrode active material, 1-15 wt % of the conductive agent, 0.999-10 wt % of the binder, and 0.001-2 wt % of the auxiliary agent.

10. The negative electrode sheet according to claim 1, wherein the silicon-based material is selected from at least one of nano silicon, $SiO_x$ ($0<x<2$), aluminum-silicon alloy, magnesium-silicon alloy, boron-silicon alloy, phosphorus-silicon alloy, and lithium-silicon alloy.

11. The negative electrode sheet according to claim 1, wherein the negative electrode active material further comprises a carbon-based material, and the carbon-based material is selected from at least one of artificial graphite, natural graphite, hard carbon, soft carbon, mesocarbon microbead, fullerene, and graphene.

12. A lithium-ion battery, comprising the negative electrode sheet according to claim 1.

13. The lithium-ion battery according to claim 12, wherein each of $R_1$ and $R'_1$ is the terminal group, and at least one of $R_1$ and $R'_1$ comprises at least one of the following groups as the terminal group:—O—(C═O)—C($R_2$)═C $(R'_2)(R'2)$, $-N(R_3)-(C=O)-C(R_2)=C(R'_2)(R'_2)$, $-C(R_2)=C(R'_2)(R'_2)$, $-C\equiv C-R'_2$; wherein $R_2$ is selected from H or an organic functional group; $R'_2$ are the same or different, and independently selected from H or an organic functional group; $R_3$ is selected from H or $C_{1-3}$ alkyl.

14. The lithium-ion battery according to claim 13, wherein one or both of $R_1$ and $R'_1$ comprise one or two of the following groups as the terminal group: $-O-(C=O)-C(R_2)-C(R'_2)(R'_2)$, $-N(R_3)-(C=O)-C(R_2)=C(R'_2)(R'_2)$, $-C(R_2)=C(R'_2)(R'_2)$, $-C\equiv C-R'_2$, wherein $R_2$ is selected from H or $C_{1-6}$ alkyl; $R'_2$ are the same or different, and independently selected from H or $C_{1-6}$ alkyl; $R_3$ is selected from H or $C_{1-3}$ alkyl; and/or R and R' are the same or different, and independently selected from absent, alkylene, $-NR_3-$, wherein $R_3$ is H or $C_{1-3}$ alkyl.

15. The lithium-ion battery according to claim 14, wherein the polyphenylene ether chain segment has a repeating unit represented by Formula 2:

Formula 2

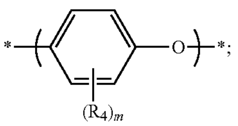

in Formula 2, $R_4$ is selected from H or $C_{1-6}$ alkyl, and m is an integer between 0 and 4.

16. The lithium-ion battery according to claim 12, wherein the compound represented by Formula 1 has a number-average molecular weight of 200-3000.

* * * * *